United States Patent
Dowd

(10) Patent No.: US 12,360,027 B2
(45) Date of Patent: Jul. 15, 2025

(54) BLADE SHARPNESS TESTING DEVICE

(71) Applicant: Anago Limited, Hamilton (NZ)

(72) Inventor: Peter Christopher Dowd, Hamilton (NZ)

(73) Assignee: Anago Limited (NZ)

( * ) Notice: Subject to any disclaimer, the term of this patent is extended or adjusted under 35 U.S.C. 154(b) by 189 days.

(21) Appl. No.: 18/119,802

(22) Filed: Mar. 9, 2023

(65) Prior Publication Data

US 2023/0288303 A1 Sep. 14, 2023

(30) Foreign Application Priority Data

Mar. 9, 2022 (AU) .................................. 2022201621

(51) Int. Cl.
*G01N 3/58* (2006.01)
*G01L 5/00* (2006.01)
*G01L 5/107* (2020.01)
*G01L 5/106* (2020.01)

(52) U.S. Cl.
CPC ................ *G01N 3/58* (2013.01); *G01L 5/107* (2013.01); *G01L 5/0038* (2013.01); *G01L 5/0061* (2013.01); *G01L 5/0076* (2013.01); *G01L 5/106* (2013.01)

(58) Field of Classification Search
CPC ... G01L 5/0076; G01L 5/0061; G01L 5/0038; G01L 5/106; G01L 5/107; G01L 3/58; G01N 3/58
See application file for complete search history.

(56) References Cited

U.S. PATENT DOCUMENTS

| 925,384 | A | * | 6/1909 | Richardson | .......... G01B 3/1056 33/770 |
| 3,062,351 | A | * | 11/1962 | Canny | ...................... B41J 31/10 400/221.2 |
| 11,092,527 | B1 | * | 8/2021 | Graves | ...................... G01N 3/58 |
| 11,474,014 | B1 | * | 10/2022 | Graves | .................. G01L 5/0066 |
| 2019/0277741 | A1 | * | 9/2019 | Staub | ..................... B23Q 17/09 |

* cited by examiner

*Primary Examiner* — Paul M. West

(74) *Attorney, Agent, or Firm* — Gloria Tsui-Yip; Gottlieb, Rackman & Reisman, P.C.

(57) ABSTRACT

The apparatus for testing the sharpness of a blade is arranged with a tape extending between a feeder spool and a receiver spool. The apparatus applies tension to the tape, and has a carriage arranged to bring the blade into contact with a stretch of the tape. The blade progressively makes a longways cut in the tape and, as it does, a measuring device detects the amount of force exerted for the cut to occur to determine whether the blade is sharp. A clamp locks the stretch of tape when in a straight line for contact with the blade, and has a main opening through which the tape moves longitudinally when driven between the spools A guide is arranged to help keep the stretch of tape in the straight line and has a main opening through which the tape moves longitudinally when driven between the feeder and receiver spools.

14 Claims, 4 Drawing Sheets

BLADE SHARPNESS TESTING DEVICE

FIELD OF THE INVENTION

Figure 1:
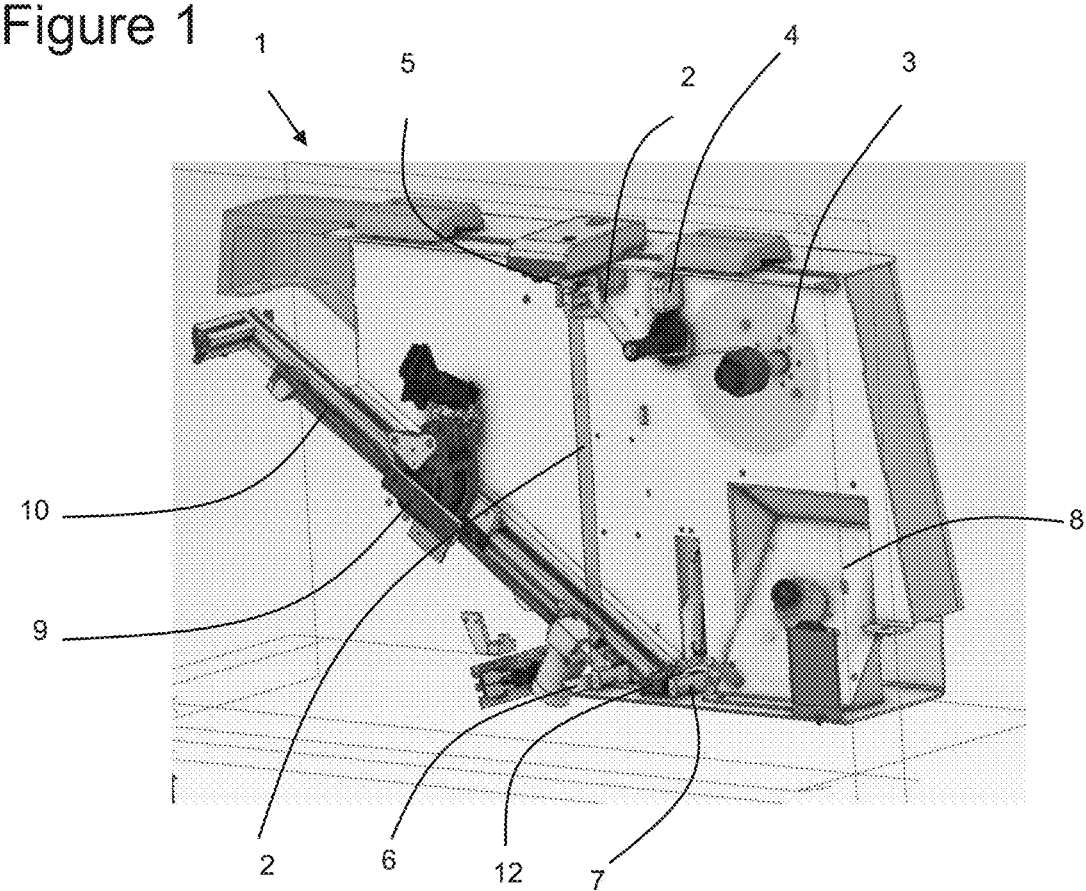

This invention relates to a device for testing the sharpness of blades, for example knife blades or the like. It enables a determination to be made as to whether the blade is sufficiently sharp.

BACKGROUND

Blades are used for cutting tasks in many industries, for example in the meat processing industry or other food related businesses. In this context it is important that a blade be sufficiently sharp so as to maintain operational efficiency. For example, in a meat works environment blunt knives, whether they be manually or machine operated, can lead to lower output and a lower quality product. It is therefore important to be able to efficiently realise when the knives being used are not sharp enough for optimum efficiency.

OBJECT OF THE INVENTION

It is an object of preferred embodiments of the invention to at least go some way towards addressing the above problem. While this applies to preferred embodiments, it should be understood that the object of the invention per se is simply to provide the public with a useful choice. Therefore, any advantages or benefits applicable to a preferred embodiment should not be taken as a limitation on any claim expressed more broadly.

Definitions

The term "comprises" or "has", if and when used in this document in relation to one or more features, should not be seen as excluding the option of there being additional unmentioned features. The same applies to derivative terms such as "comprising" and "having".

SUMMARY OF THE INVENTION

Apparatus for testing the sharpness of a cutting blade, comprising:
 tape extending between a feeder and a receiver;
 tensioning means arranged to apply tension to the tape;
 a carrier arranged to bring the blade and a stretch of the tape into contact such that the blade progressively makes a long-ways cut in it;
 measuring means arranged to detect the amount of force exerted between the blade and the stretch of tape necessary for the cut to occur and, based on this, to determine whether the blade or parts of it are sufficiently sharp;
 characterised in that the apparatus has:
 a clamp arranged to lock the stretch of tape when in a straight line for contact with the blade, the clamp having a main opening through which the tape moves longitudinally when driven between the feeder and receiver, and also having a side opening arranged to enable the tape to be side-loaded into the clamp; and
 a guide arranged to retain the stretch of tape in the straight line, the guide having a main opening through which the tape moves longitudinally when driven between the feeder and receiver and also having a side opening arranged to enable the tape to be side-loaded into the guide.

Optionally the apparatus has a second guide arranged to retain a second stretch of the tape in a straight line between the two guides such that the second stretch of tape is presented to and engaged by a further clamp.

Optionally the second guide has a main opening through which the tape moves longitudinally when driven between the feeder and receiver and also has a side opening arranged to enable the tape to be side-loaded into that guide.

Optionally each side opening is sufficiently wide to enable the tape to be pass through it side-edge first, but is not sufficiently wide to enable the tape to pass through it face first.

Optionally the side opening of the second guide is sufficiently wide to enable the tape to be slid through it side-edge first, but is not sufficiently wide to enable the tape to pass through it face first.

Optionally the feeder comprises a spool on which some of the tape is wound.

Optionally the receiver comprises a spool on which some of the tape is wound.

Optionally the feeder comprises a spool on which some of the tape is wound and the receiver comprises a spool on which some of the tape is wound.

Optionally the tensioning means comprises a driver arranged to cause the receiver to pull on the tape to maintain it under tension while the cut is made.

Optionally the carrier comprises a carriage arranged to travel along a downwards incline to approach the tape and make the long-ways cut.

Optionally the apparatus comprises a downwardly inclined track along which the carriage moves.

Optionally the clamp comprises a lever which is able to be pivoted by hand to releasably cam lock the tape to the clamp.

Optionally the guide, or each guide if there are two guides, has a ledge above its side opening and the tape is face down on the ledge.

DRAWINGS

Figure 1A:
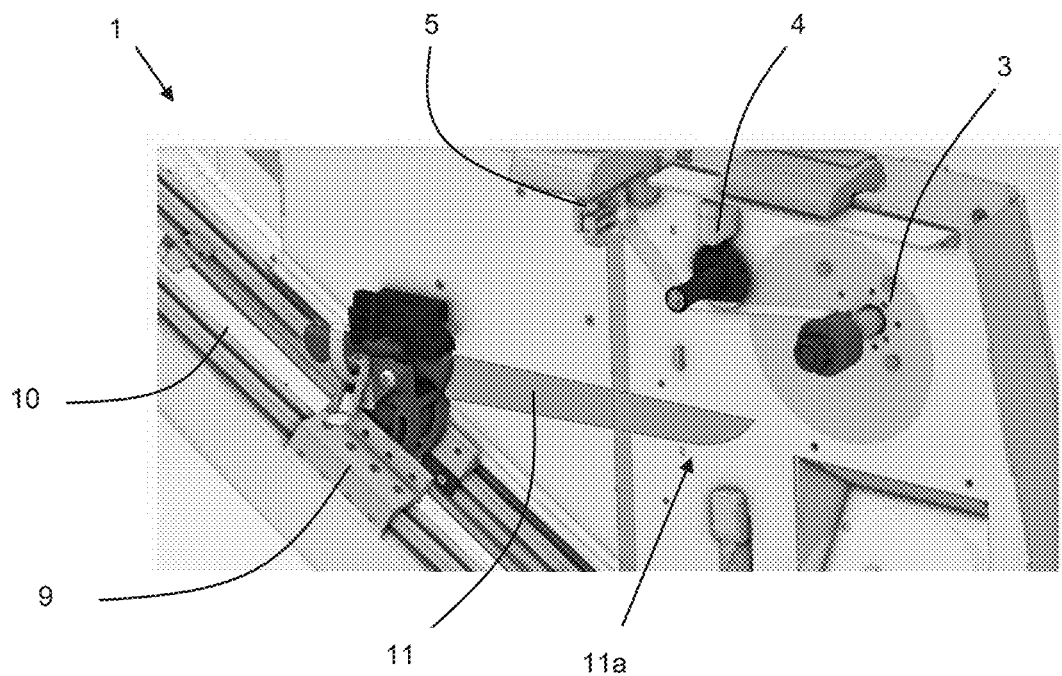
Figure 2:
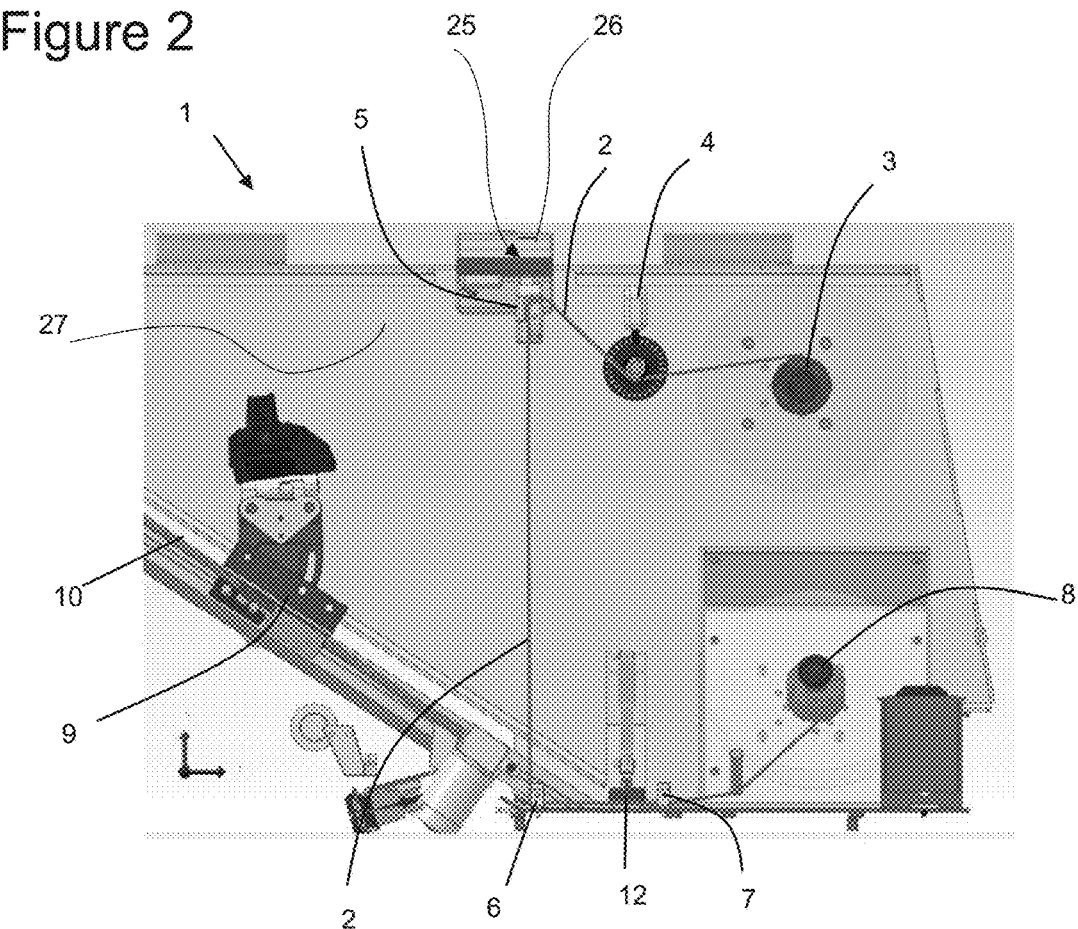
Figure 3:
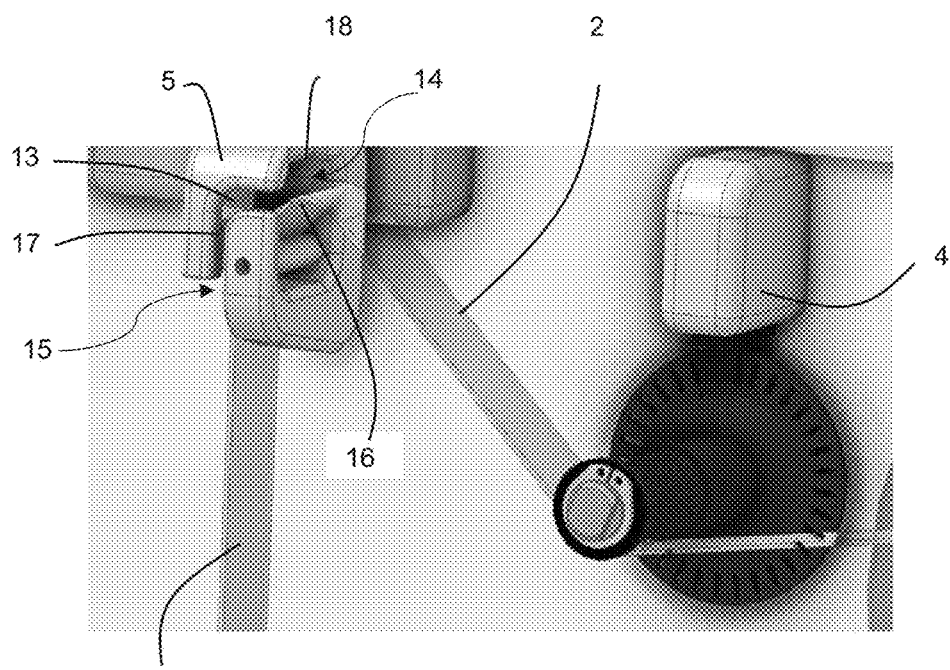
Figure 4:
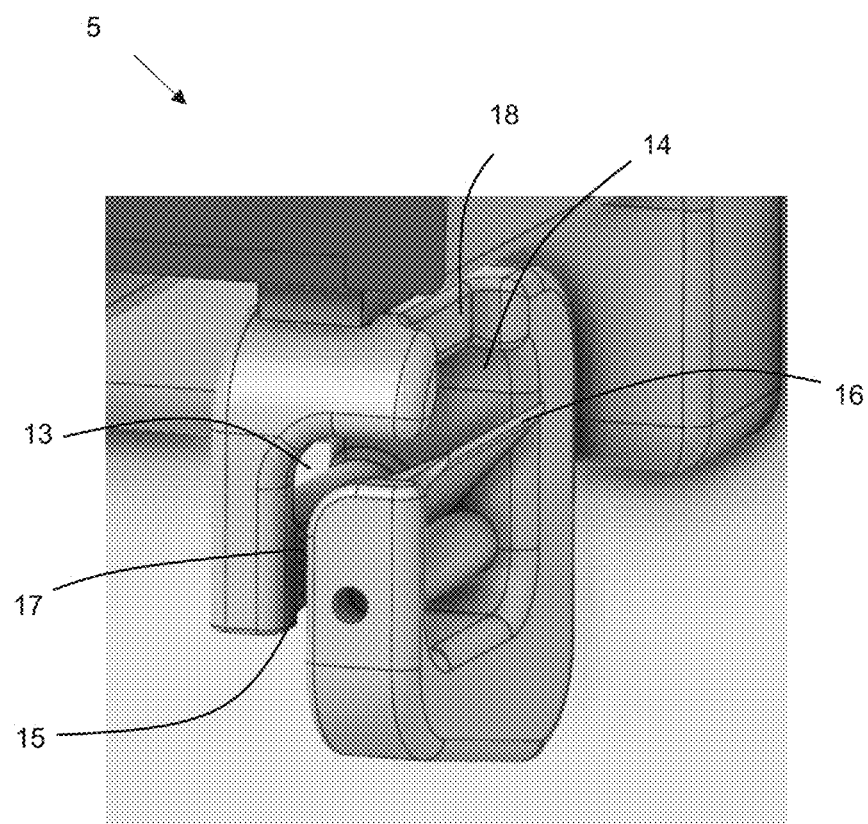
Figure 5:
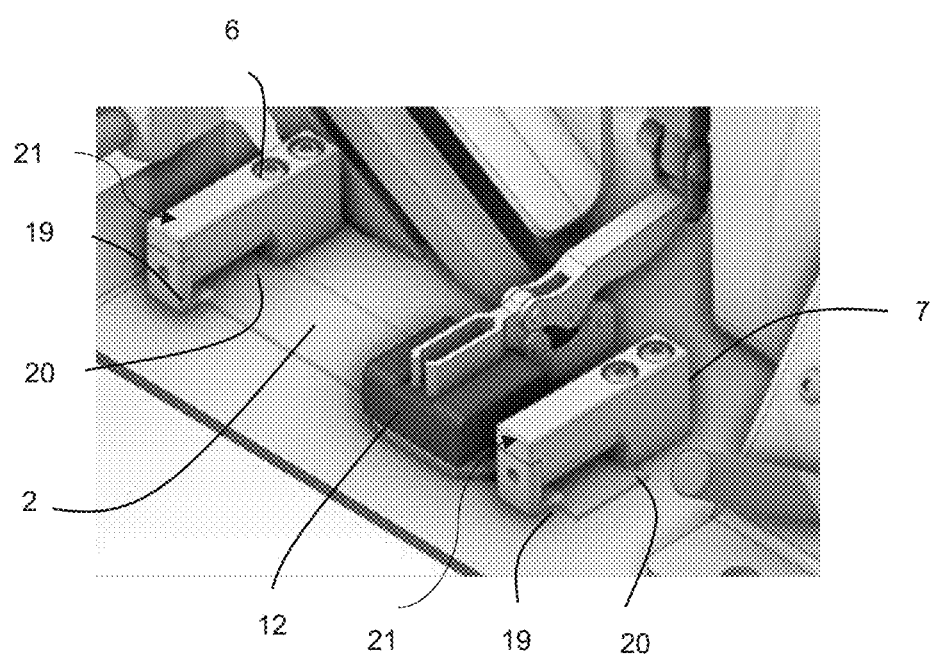
Figure 6:
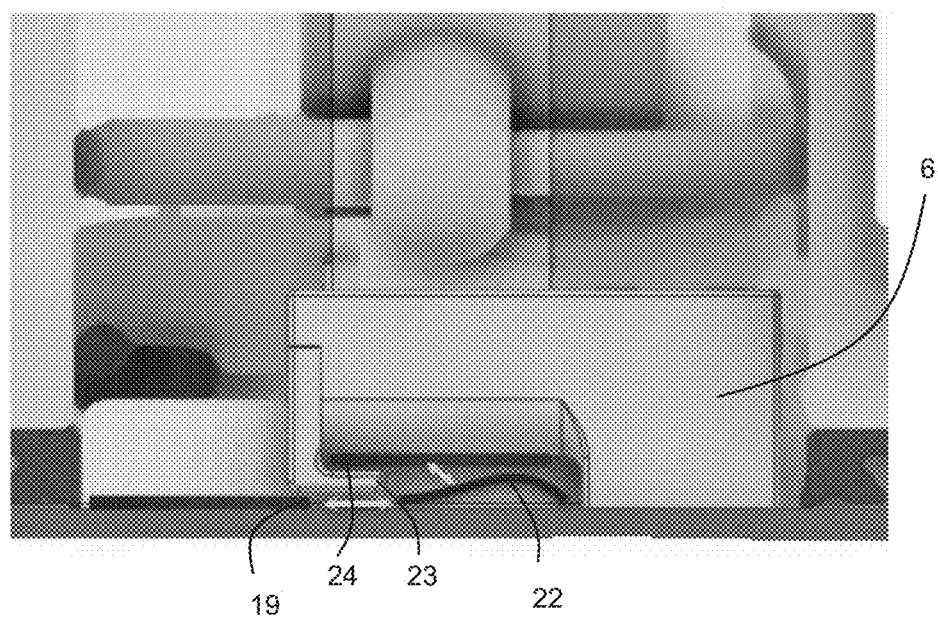

Some preferred embodiments of the invention will now be described by way of example and with reference to the accompanying drawings, of which:

FIG. 1 is an isometric view of a blade sharpness testing device;
 FIG. 1a is an isometric view of the device when in use testing the blade of a knife;
 FIG. 2 is a side elevation view of the device;
 FIG. 3 is an isometric view of a clamp forming part of the device;
 FIG. 4 is an isometric view showing detail of the clamp;
 FIG. 5 is an isometric view showing guides that form part of the device; and
 FIG. 6 is an end elevation view showing detail of one of the guides.

DETAILED DESCRIPTION

Referring to FIGS. 1, 1a and 2, the blade sharpness testing device 1 is used for determining the sharpness of a blade, for example the blade of a knife. The device is such that it allows side-loading of a strip material, for example a tape 2, to be cut as part of a test run.

The tape 2 is connected to a receiver, which in this embodiment is an upper spool 3. From there the tape passes under and engages with a meter 4, extends upwards to a clamp 5, and then down to a first guide 6 disposed at the floor of the device. The tape then extends laterally to a second guide 7 which is also at the floor of the device. From there the tape proceeds upwards to a feeder which, in the embodiment shown, is a lower spool 8.

The arrangement is such that as a length of tape 2 is progressively wound from the lower spool 8, a corresponding amount of the tape is wound onto the upper spool 3. This assists to keep the tape 2 tidily set and stowed in the device. It also means there is a good supply of tape, ready to be cut, for subsequent test-runs.

The purpose of the meter 4 is to measure the amount of tape that is fed from the lower spool 8, so that the device is able to determine by digital processing when a sufficient 'new stretch' of the tape has been played out. The amount is sufficient when a previously cut portion of the tape has been wound 'out of the way', onto the upper spool 3, so as to leave an un-cut new stretch of the tape extending from the clamp 5 to the first guide 6. The meter may comprise a photo-interrupter.

With further reference to FIGS. 1 and 2, the device comprises a carriage 9 arranged to move along an inclined track 10 towards the strip when a blade sharpness test is being run. When in use the carriage holds a knife 11 (see FIG. 1a) aimed so that its pointed end is forward, and the sharp edge 11a of its blade faces downwards. As the carriage moves down the incline of the track the blade is caused to progressively make a long-ways cut in the stretch of tape extending between the clamp 5 and the first guide 6. The amount of force needed to make the cut is sensed and digitally captured, and is used to determine the sharpness of the blade. In other words, the more force that is needed the blunter the blade, and the less force needed the sharper the blade. The force may vary along different parts of the blade because some zones of it may be sharper than others. These variations are detected so as to provide a profile of sharpness along the blade. The profile is reported graphically, on screen, and lets a human operator know which parts of the blade, if any, are in need of sharpening and to what degree.

More specifically, the amount of force needed to cause the blade to make the long-ways cut is measured by a force sensor 25 that attaches to the top of the clamp 5 and connects it to the main structure 27 of the device via a support bracket 26. The sensor 25 detects changes in tension on the stretch of tape between clamp 5 and guide 6 during the cutting, and equates more tension with more force (and therefore blade bluntness) and less tension with less force (and therefore blade sharpness).

Referring to FIGS. 3 and 4, the clamp 5 is located just above the portion of tape 2 that is about to be cut in a test run. As shown, the clamp 5 has a side opening 13 by which the tape 2 can be conveniently loaded into the clamp sideways. In other words, the tape is loaded thin or side-edge in first and with clearance between the tape and the boundaries of the opening. However, at the same time the opening 13 is substantially narrower than the distance across the face of the tape. This means that the tape cannot be conveniently loaded into the opening face first.

This ability for side-loading of the clamp saves a human operator having to get a loose end of the strip and thread it into the clamp through its upper front opening 14 and then out its lower rear opening 15, or vice versa. Rather, the tape can be more efficiently loaded while its ends remain engaged with the spools 3, 8. The arrangement is such that when tape has been side-loaded, the leading end of a pivoting cam lever 16 which forms part of the clamp is pressed up by a spring or similar. This causes a trailing end of the lever to swing up, 'over-centre', and press the tape against a series of gripping teeth 17 at the lower internal back wall of the clamp. This effectively 'cam locks' the tape and prevents it being wound onto, the spool 3. As also shown, there is a rebate 18 in the front roof of the clamp to enable a human user to more easily manipulate the lever 16 by hand. Pressing down on lever 16 by hand releases the locking mechanism and makes it easier to load the tape. As the tape is wound from the feeding spool to the receiving spool it presses down on lever 16, automatically disengaging the clamp and enable the tape to flow.

Preferably a lower clamp 12 is clamped when the feeder spool 8 has tensioned the tape to the required level. The tape is then clamped top and bottom so that during testing only force from the action of the blade cutting the tape will impact the tension on the tape.

Referring to FIGS. 5 and 6, the guides 6, 7 are of the same construction and each has a side-opening 19 just above the floor of the device. The arrangement is such that the tape 2 can pass through that opening to side-load into the guide. It avoids the need to locate a loose end of the tape and thread it, end-first, through the guide's front and rear openings 20, 21. As with the clamp, each side-opening 19 is wide enough to admit the tape's thin or side-edge first, but not face first.

Referring to FIG. 6, when the tape is slid into the side-opening 19 it initially lays flat against the floor of the device. However, because the tape is flexible it can be manipulated by hand to arc upwards, or curl a little, as indicated at 22. This enables the tape to be more easily move up through a limited space so that when it is released it recoils to a flat disposition and sits on top of a ledge, eg on a foot 23, as indicated at 24. In this position there is relatively little clearance between the tape and the internal side walls of the guide, but enough to enable the tape to freely pass through the guide when it is being fed, and taken up, by the spools 8, 3.

For conducting a blade sharpness test, the stretch of tape between the clamp 5 and the lower spool 8 needs to be pre-tensioned and maintained at a functional amount of tension during a test run, i.e. so that changes in tension on the tape can be picked up by the sensor 25. Such pre-tension is the result of a pulling force by a driver acting on the lower spool 8 and is maintained by the locking action of the clamp 5. In this regard the clamp 12 locks the lower end of the tape between the guides 6 and 7.

Preferably the tape is in the form of a mesh strip, formed so that each cross-thread of the mesh has to be cut by the blade during a test, i.e. independently one after the other, to avoid a situation where a cut forms too easily as a result of 'flow-on tearing', or 'crack-propagation', once a cut has been started.

In the embodiments above, the arrangement is such that the blade is moved towards the tape to cause the cut. However in alternative embodiments the blade may be stationary and the tape moved to contact it.

While some forms of the invention have been described by way of example, it should be appreciated that modifications and improvements can be made without departing from the scope of the following claims.

In terms of disclosure, this document envisages and hereby posits any feature mentioned herein in combination with any other feature or features mentioned herein, even if the combination is not claimed.

The invention claimed is:
1. Apparatus for testing the sharpness of a cutting blade, comprising:
tape extending between a feeder and a receiver;
tensioning means arranged to apply tension to the tape;

a carrier arranged to bring the blade and a stretch of the tape into contact such that the blade progressively makes a long-ways cut in it;

measuring means arranged to detect the amount of force exerted between the blade and the stretch of tape necessary for the cut to occur and, based on this, to determine whether the blade or parts of it are sufficiently sharp;

characterised in that the apparatus has:

a first clamp arranged to lock the stretch of tape when in a straight line for contact with the blade, the first clamp having a main opening through which the tape moves longitudinally when driven between the feeder and receiver, and also having a side opening arranged to enable the tape to be side-loaded into the first clamp;

a first guide arranged to retain a first stretch of the tape in the straight line, the first guide having a main opening through which the tape moves longitudinally when driven between the feeder and receiver and also having a side opening arranged to enable the tape to be side-loaded into the first guide; and a second guide arranged to retain a second stretch of the tape in a straight line between the first and second guides such that the second stretch of tape is presented to and is engaged by a second clamp.

2. Apparatus according to claim 1, wherein the second guide has a main opening through which the tape moves longitudinally when driven between the feeder and receiver and also has a side opening arranged to enable the tape to be side-loaded into that guide.

3. Apparatus according to claim 1, wherein each side opening is sufficiently wide to enable the tape to pass through it side-first, but is not sufficiently wide to enable the tape to freely pass through it face first.

4. Apparatus according to claim 1, wherein the side opening of the second guide is sufficiently wide to enable the tape to be slid through it side-edge first, but is not sufficiently wide to enable the tape to pass through it face first.

5. Apparatus according to claim 1, wherein the feeder comprises a spool on which some of the tape is wound.

6. Apparatus according to claim 1, wherein the receiver comprises a spool on which some of the tape is wound.

7. Apparatus according to claim 1, wherein the feeder comprises a spool on which some of the tape is wound and the receiver comprises a spool on which some of the tape is wound.

8. Apparatus according to claim 1, wherein the tensioning means comprises a driver arranged to cause either the receiver or the feeder to pull on the tape to maintain it under tension prior to it being clamped.

9. Apparatus according to claim 1, wherein the carrier comprises a carriage arranged to travel along a downwards incline to approach the tape and make the long-ways cut.

10. Apparatus according to claim 9, comprising a downwardly inclined track along which the carriage moves.

11. Apparatus according to claim 1, wherein the first clamp comprises a lever which is able to be pivoted by spring or hand to releasably lock the tape to the clamp.

12. Apparatus according to claim 1, wherein each guide has a ledge above its side opening and the tape is face down on the ledge.

13. Apparatus according to claim 1, wherein:

the apparatus has a force sensor attached to the first clamp such that the force sensor is adapted to detect variations of tension in the tape as the blade makes the cut, the variations being indicative of how sharp the blade is;

the second guide has a main opening through which the tape moves longitudinally when driven between the feeder and receiver and also has a side opening arranged to enable the tape to be side-loaded into that guide;

the side opening of each clamp and guide is sufficiently wide to enable the tape to be slid through it side-first, but is not sufficiently wide to enable the tape to freely pass through it face first;

the first clamp comprises a lever which is able to be pivoted by spring or hand to releasably lock the tape to the first clamp;

each guide has a ledge above its side opening and the tape is face down on the ledge;

the feeder comprises a spool on which some of the tape is wound and the receiver comprises a spool on which some of the tape is wound;

the tensioning means comprises a driver arranged to cause either the receiver or the feeder to pull on the tape to maintain it under tension prior to clamping; and the carrier comprises a carriage arranged to travel along a downwards inclined track to approach the tape and make the long-ways cut.

14. Apparatus for testing the sharpness of a cutting blade, comprising:

tape extending between a feeder and a receiver;

tensioning means arranged to apply tension to the tape;

a carrier arranged to bring the blade and a stretch of the tape into contact such that the blade progressively makes a long-ways cut in it;

measuring means arranged to detect the amount of force exerted between the blade and the stretch of tape necessary for the cut to occur and, based on this, to determine whether the blade or parts of it are sufficiently sharp;

characterised in that the apparatus has:

a clamp arranged to lock the stretch of tape when in a straight line for contact with the blade, the clamp having a main opening through which the tape moves longitudinally when driven between the feeder and receiver, and also having a side opening arranged to enable the tape to be side-loaded into the clamp;

a guide arranged to retain the stretch of tape in the straight line, the guide having a main opening through which the tape moves longitudinally when driven between the feeder and receiver and also having a side opening arranged to enable the tape to be side-loaded into the guide; and a force sensor attached to the clamp, the force sensor being adapted to detect variations of tension in the tape as the blade makes the cut, the variations being indicative of how sharp the blade is.

* * * * *